US012500508B2

(12) United States Patent
Cacciotto

(10) Patent No.: US 12,500,508 B2
(45) Date of Patent: Dec. 16, 2025

(54) CONTROL CIRCUIT FOR AN ELECTRONIC CONVERTER, RELATED INTEGRATED CIRCUIT, ELECTRONIC CONVERTER AND METHOD

(71) Applicant: STMICROELECTRONICS S.r.l., Agrate Brianza (IT)

(72) Inventor: Fabio Cacciotto, Camporotondo Etneo (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 129 days.

(21) Appl. No.: 18/360,598

(22) Filed: Jul. 27, 2023

(65) Prior Publication Data

US 2024/0039391 A1 Feb. 1, 2024

(30) Foreign Application Priority Data

Aug. 1, 2022 (IT) ........................ 102022000016299

(51) Int. Cl.
*H02M 3/157* (2006.01)
*H02M 1/00* (2007.01)
*H02M 1/088* (2006.01)
*H03K 7/08* (2006.01)

(52) U.S. Cl.
CPC ......... *H02M 1/088* (2013.01); *H02M 1/0025* (2021.05); *H02M 3/157* (2013.01); *H03K 7/08* (2013.01)

(58) Field of Classification Search
CPC .. H02M 1/088; H02M 1/0025; H02M 1/0003; H02M 3/33507; H02M 3/156; H02M 3/157
See application file for complete search history.

(56) References Cited

U.S. PATENT DOCUMENTS

| 8,436,599 | B2 | 5/2013 | Cacciotto |
| 10,924,009 | B2 * | 2/2021 | Chen ..................... H02M 3/156 |
| 12,231,028 | B2 * | 2/2025 | Mei ........................ H02M 1/08 |
| 2013/0187624 | A1 | 7/2013 | Wakasugi |
| 2014/0159689 | A1 | 6/2014 | Chen |

(Continued)

FOREIGN PATENT DOCUMENTS

EP 1797631 A0 6/2007

OTHER PUBLICATIONS

Wuidart, Application Note: Topologies for Switched Mode Power Supplies (AN513/0393), STMicroelectronics, 1999, 18 pages.

*Primary Examiner* — Sisay G Tiku
(74) *Attorney, Agent, or Firm* — Seed Intellectual Property Law Group LLP

(57) ABSTRACT

A control circuit for a switching stage of an electronic converter a driver circuit configured to generate one or more drive signals as a function of a Pulse-Width Modulation (PWM) signal and a PWM signal generator circuit configured to generate the PWM signal. A first comparator asserts a comparison signal when a feedback signal having a voltage being indicative of a current flowing through an inductance of the switching stage is greater than a reference signal. In response to a clock signal, a storage element asserts the PWM signal, whereby the clock signal indicates the duration of the switching period of the PWM signal. Conversely, in response to determining that the comparison signal is asserted, the storage element de-asserts the PWM signal.

18 Claims, 9 Drawing Sheets

(56) References Cited

U.S. PATENT DOCUMENTS

| | | | |
|---|---|---|---|
| 2014/0217999 A1 | 8/2014 | Wibben et al. | |
| 2014/0340949 A1 | 11/2014 | Chen et al. | |
| 2015/0009721 A1* | 1/2015 | Huang | H02M 3/33507 |
| | | | 363/21.17 |
| 2018/0041119 A1 | 2/2018 | Zhang et al. | |
| 2018/0337599 A1* | 11/2018 | Chen | H02M 3/158 |
| 2019/0305666 A1 | 10/2019 | Yang et al. | |
| 2020/0127565 A1* | 4/2020 | Liang | H02M 3/156 |
| 2020/0144906 A1* | 5/2020 | Endo | H02M 3/33507 |
| 2022/0209665 A1* | 6/2022 | Li | H02M 1/0025 |
| 2023/0246552 A1* | 8/2023 | Cacciotto | H02M 1/0009 |
| | | | 363/21.13 |
| 2023/0275573 A1* | 8/2023 | Mei | H02M 3/156 |
| | | | 323/271 |

\* cited by examiner

CONTROL CIRCUIT FOR AN ELECTRONIC CONVERTER, RELATED INTEGRATED CIRCUIT, ELECTRONIC CONVERTER AND METHOD

BACKGROUND

Technical Field

The embodiments of the present description refer to a control device for an electronic converter.

Description of the Related Art

Power-supply circuits, such as AC/DC or DC/DC switched mode power supplies, are well known in the art. There exist many types of electronic converters, which are mainly divided into isolated and non-isolated converters. For instance, non-isolated electronic converters are the converters of the "buck," "boost," "buck-boost," "Ćuk," "SEPIC," and "ZETA" type. Instead, isolated converters are, for instance, converters of the "flyback," "forward," "half-bridge," and "full-bridge" type. Such types of converters are well known to the person skilled in the art, as evidenced, e.g., by the application note AN513/0393 "Topologies for Switched Mode Power Supplies," L. Wuidart, 1999, STMicroelectronics.

FIG. 1 is a schematic illustration of a DC/DC electronic converter 20. In particular, a generic electronic converter 20 includes two input terminals 200a and 200b for receiving a DC voltage $V_{in}$ and two output terminals 202a and 202b for supplying a DC voltage $V_{out}$. For example, the input voltage $V_{in}$ may be supplied by a DC voltage source 10, such as a battery, or may be obtained from an AC voltage by means of a rectifier circuit, such as a bridge rectifier, and possibly a filtering circuit. Instead, the output voltage $V_{out}$ may be used to supply a load 30.

For example, FIG. 2 shows the circuit schematic of a typical buck converter 20. In particular, a buck converter 20 includes two input terminals 200a and 200b for receiving a DC input voltage $V_{in}$ and two output terminals 202a and 202b for supplying a regulated voltage $V_{out}$, where the output voltage is equal to or lower than the input voltage $V_{in}$, or a regulated current $i_{out}$.

In particular, typically, a buck converter 20 includes two electronic switches Q1 and Q2 (with the current path thereof) connected (e.g., directly) in series between the input terminals 200a and 200b, wherein the intermediate node between the electronic switches Q1 and Q2 represents a switching node Lx. Specifically, the electronic switch Q1 is a high-side switch connected (e.g., directly) between the (positive) terminal 200a and the switching node Lx, and the electronic switch Q2 is a low-side switch connected (e.g., directly) between the switching node Lx and the (negative) terminal 200b, which often represents a ground GND. The (high-side) switch Q1 and the (low-side) switch Q2 hence represent a half-bridge configured to connect the switching node Lx to the terminal 200a (voltage $V_{in}$) or the terminal 200b (ground GND).

For example, the switches Q1 and/or Q2 are often transistors, such as Field-Effect Transistors (FETs), such as Metal-Oxide-Semiconductor Field-Effect Transistors (MOSFETs), e.g., n-channel FETs, such as NMOS transistors. Frequently, the second electronic switch Q2 is also implemented just with a diode, where the anode is connected to the terminal 200b and the cathode is connected to the switching node Lx.

In the example considered, an inductance L, such as an inductor, is connected (e.g., directly) between the switching node Lx and the (positive) output terminal 202a. Instead, the (negative) output terminal 202b is connected (e.g., directly) to the (negative) input terminal 200b. In the example considered, to stabilize the output voltage $V_{out}$, the converter 20 typically includes a capacitor $C_{out}$ connected (e.g., directly) between the output terminals 202a and 202b. Substantially, the inductance L and the capacitor $C_{out}$ implement an output filter. In general, in case of a regulated current source, the output capacitor Cout may also be omitted.

In this context, FIG. 3 shows exemplary waveforms of the signals of such an electronic converter, where:

FIG. 3a shows the signal $DRV_1$ for switching the electronic switch Q1;

FIG. 3b shows the signal $DRV_2$ for switching the second electronic switch Q2;

FIG. 3c shows the current $I_{Q1}$ that traverses the electronic switch Q1;

FIG. 3d shows the voltage $V_{Lx}$ at the switching node Lx (i.e., the voltage at the second switch Q2); and FIG. 3e shows the current $I_L$ that traverses the inductor L.

In particular, when the electronic switch Q1 is closed at an instant $t_1$ (ON state), the current $I_L$ in the inductor L increases (substantially) linearly. The electronic switch Q2 is at the same time opened. Instead, when the electronic switch Q1 is opened after an interval $T_{ON1}$ at an instant $t_2$ (OFF state), the electronic switch Q2 is closed, and the current $I_L$ decreases (substantially) linearly. Finally, the switch Q1 is closed again after an interval $T_{OFF1}$. In the example considered, the switch Q2 (or a similar diode) is hence closed when the switch Q1 is open, and vice versa.

The current $I_L$ can thus be used to charge the capacitor $C_{out}$, which supplies the voltage $V_{out}$ at the terminals 202a and 202b.

In the example considered, the electronic converter 20 includes thus a control circuit 22 configured to drive the switching of the switch Q1, and possibly of the switch Q2, for repeating the intervals $T_{ON1}$ and $T_{OFF1}$ periodically. For example, typically the buck converter 20 includes also a feedback circuit 24, such as a voltage divider, configured to generate a feedback signal FB indicative of (and preferably proportional to) the output voltage $V_{out}$, and the control circuit 22 is configured to generate the drive signals $DRV_1$ and optionally $DRV_2$ by comparing the feedback signal FB with a reference signal, such as a reference voltage $V_{REF}$.

Specifically, as well known, a buck converter may be operated in a Continuous-Conduction Mode (CCM), Discontinuous-Conduction Mode (DCM) or Transition Mode (TM).

As shown in FIG. 4A, when the control circuit 22 operates the converter in the CCM mode, the current $I_L$ flowing through the inductance L has a value different from zero at the end of the interval $T_{OFF1}$ (see FIG. 3). In this case, the control circuit 22 uses two switching phases $T_1$ and $T_2$, with $T_{SW}=T_1+T_2$, wherein:

during the phase $T_1$ ($T_1=T_{ON}=T_{OFF2}$) the switch Q1 is closed and the switch/diode Q2 is opened; and during the phase $T_2$ ($T_2=T_{OFF1}=T_{ON2}$) the switch Q1 is opened and the switch/diode Q2 is closed.

Conversely, as shown in FIG. 4B, when the control circuit 22 operates the converter in the DCM mode, the current $I_L$ flowing through the inductance L reaches zero during the interval $T_{OFF1}$ and remains at zero until the end of the interval $T_{OFF1}$ (see FIG. 3). In this case, the control circuit 22 uses indeed three switching phases $T_1$, $T_2$ and $T_3$, with $T_{SW}=T_1+T_2+T_3$, wherein:

during the phase $T_1$ ($T_1=T_{ON1}$) the switch Q1 is closed and the switch/diode Q2 is opened;

during the phase $T_2$ ($T_2=T_{ON2}$) the switch Q1 is opened and the switch/diode Q2 is closed; and during the phase $T_3$ ($T_{OFF1}=T_2+T_3$ and $T_{OFF2}=T_3+T_1$) the switch Q1 is opened and the switch/diode Q2 is opened.

For example, when using a diode as switch Q2, this diode will automatically open when the current $I_L$ reaches zero, thereby ending the interval $T_2$. Conversely, when using a controllable electronic switch Q2, usually the control circuit 22 includes (or is connected to) a demagnetization detection circuit configured to determine the instant when the current $I_L$ reaches zero (corresponding to the end of the interval $T_2$ and the beginning of the interval $T_3$).

In general, it is sufficient that the demagnetization detection circuit provides a signal $CS_1$ indicating the instant when the current $I_L$ reaches zero. For example, such a demagnetization detection circuit may monitor the current $I_L$. For example, in FIG. 2 are shown three current sensors:

a current sensor 24a configured to generate a signal CSa indicative of (and preferably proportional to) the current $I_L$ flowing through the inductance L, a current sensor 24b configured to generate a signal CSb indicative of (and preferably proportional to) the current flowing through the switch Q1, which is thus indicative of the current $I_L$ during the interval $T_1$, and a current sensor 24c configured to generate a signal CSc indicative of (and preferably proportional to) the current flowing through the switch Q2, which is thus indicative of the current $I_L$ during the interval $T_2$.

For example, such current sensors may measure a voltage drop at an additional shunt resistor, at a resistance of the respective inductance or electronic switch, or also via more complex indirect measurement circuits. Accordingly, in the example considered, the signal $CS_1$ may correspond to the signal CSa or CSb.

A significant number of driving schemes are known for generating the drive signal $DRV_1$ and optionally $DRV_2$. These solutions have in common the possibility of regulating the output voltage $V_{out}$ by regulating the duration of the interval $T_{ON1}$ and/or the interval $T_{OFF1}$.

For example, FIG. 5 shows a typical control scheme for an electronic converter, wherein a Pulse-Width Modulation (PWM) signal generator 220 is configured to generate a PWM signal DRV and a driver circuit 226 is configured to generate the drive signal $DRV_1$ (and when used the signal $DRV_2$) as a function of the PWM signal DRV.

Specifically, as shown in FIGS. 6, the signal DRV has a switch-on interval $T_{ON}$ and a switch-off interval $T_{OFF}$, wherein the duty cycle $DC=T_{ON}/T_{SW}$ of the PWM signal DRV is variable, where $T_{SW}=T_{ON}+T_{OFF}$ corresponds to the period of the switching interval.

Specifically, in the example considered, the PWM signal generator circuit 220 includes a PWM signal modulator circuit 224 configured to generate the PWM signal DRV as a function of a regulation/control signal, wherein the regulation/control signal indicates the time $T_{ON}$ or the duty cycle DC. In this type of control circuit, the PWM signal modulator circuit 224 usually generates a PWM signal DRV having a constant (or at least predetermined) switching period $T_{SW}$.

For example, in CCM, the driver circuit 226 may use the signal DRV as the drive signal $DRV_1$. Conversely, the optional signal $DRV_2$ may correspond to the inverted version of the signal $DRV_1$. Conversely, in DCM, the driver circuit 226 may use the signal DRV as the drive signal $DRV_1$. However, when using a controllable electronic switch Q2, the driver circuit 226 is in this case usually configured to open the electronic switch Q2 when the signal $CS_1$ indicates a demagnetization of the inductance L. In general, also (usually fixed) dead times may be introduced between the switching of the drive signals, e.g., between the falling edge of the signal $DRV_1$ and the rising edge of the signal $DRV_2$, and similarly (in CCM mode) between the falling edge of the signal $DRV_2$ and the rising edge of the signal $DRV_1$. Insofar as these intervals are usually short compared to the durations $T_{ON}$ and $T_{OFF}$, these intervals will not be considered in the following. However, also in this case, the drive signals $DRV_1$ and $DRV_2$ may be determined as a function of the PWM signal DRV.

For example, in known solutions, the control circuit 220 often includes also a regulator circuit 222 having at least an integral component, such as a PI (Proportional-Integral) or PID (Proportional-Integral-Derivative), wherein the regulator 222 is configured to generate the regulation signal. For example, as described in document U.S. Pat. No. 9,091,741 B2, such a PID regulator may be implemented with an error amplifier 222a, e.g., including an operational amplifier (OpAmp), and a feedback/compensation network 222a including one or more capacitors and resistors. Typically, the negative/inverting terminal of the OpAmp 222a is connected to the feedback signal FB, the positive/non-inverting terminal of the OpAmp 222a is connected to the reference voltage $V_{REF}$, and the compensation network 222b is connected between the output terminal of the OpAmp 222a and the negative/inverting terminal and/or a ground.

Such control circuits including a PWM signal generator circuit 220 are used also in many other electronic converters, such as boost, buck-boost, flyback or forward converters, various types of half-bridge converter, etc.

In this respect, FIG. 7 shows a generic electronic converter 20 using a PWM signal DRV. Specifically, the electronic converter 20 includes a switching stage 26 connected between the input terminals 200a, 200b and the output terminal 202a, and 202b. Such a switching stage 26 includes one or more electronic switches $SW_{26}$ and at least one inductance $L_{26}$, such as inductors or transformers, and optionally one or more capacitances $C_{26}$, such as capacitors. For example, in a buck converter (FIG. 2), these components are the switch Q1, the switch or diode Q2, the inductance L and the capacitance $C_{out}$.

Accordingly, in the example considered, the control circuit 22 includes a driver circuit 226 configured to generate one or more drive signals for the one or more electronic switches $SW_{26}$ of the switching stage 26 as a function of:

the PWM signal DRV, which has switching cycles $T_{SW}$, wherein the signal DRV is set to a first logic level (e.g., high) for a first duration $T_{ON}$ and to a second logic level (e.g., low) for a second duration $T_{OFF}$, with $T_{SW}=T_{ON}+T_{OFF}$ (see also FIG. 6), and an optional measurement signal $CS_1$ indicating the demagnetization of the inductance $L_{26}$.

For example, as mentioned before, the PWM signal DRV may be used to drive the switch Q1 of FIG. 2. Conversely, the measurement signal $CS_1$ may be used when the electronic converter is operated in the DCM mode, e.g., for driving the electronic switch Q2 of FIG. 2.

Accordingly, also in this case a feedback circuit 24 is used to generate a feedback signal FB indicative of (and preferably proportional to) the output quantity to be regulated, such as the output voltage $V_{out}$ (in case of a regulated voltage source), the output current $i_{out}$ (in case of a regulated current source) or also the output power $P_{out}$, with $P_{out}=V_{out} \cdot i_{out}$.

Finally, a PWM signal generator circuit 220 is configured to generate the PWM signal DRV and vary the duty-cycle DC of the PWM signal DRV as a function of the feedback signal FB and the reference signal $V_{REF}$.

Another popular control scheme for generating a PWM signal in such control circuits 22 is the Peak Current Mode (PCM), which is schematically shown in FIG. 8.

Specifically, the PWM signal generator circuit 220 is again configured to generate a PWM signal DRV with a fixed switching period $T_{SW}$ and a variable duty cycle DC. However, in this case are used two control loops.

An inner control loop receives a signal $CS_2$ indicate of (and preferably proportional to) the current flowing through the inductance L during the switch-on interval $T_{ON}$. For example, as mentioned before, for this purpose may be used the current sensor 24a providing the signal CSa or the current sensor 24b providing the signal CSb. Accordingly, in various embodiments, the signal CSa may be used both as signal $CS_1$ and as signal $CS_2$.

A shown in the foregoing, when the electronic switch Q1 is closed, the inductor current $I_L$ (and accordingly the signal $CS_2$) increases substantially linearly. In the example considered, the signal $CS_2$ is provided to a comparator 230 configured to assert its output when the signal $CS_2$ reaches or exceed a reference signal REF, i.e., when the inductor current $I_L$ reaches a given peak current $I_m$ax as indicated by the reference signal REF For example, in this case, the PWM signal modulator circuit 224 may be implemented with a storage element 232, such as a set-reset latch or flip-flop, configured to:

assert the signal DRV in response to a clock signal CK having a period $T_{SW}$, and de-assert the signal DRV in response to the comparison signal provided by the comparator 230, i.e., when the signal $CS_2$ reaches the reference signal REF.

Conversely, the outer loop is configured to regulate the reference signal REF as a function of the feedback signal FB. For example, similar to FIG. 5, a regulator circuit 222 having at least an integral component, such as a PID regulator, may be used to generate the reference signal REF as a function of the feedback signal FB and the reference signal $V_{REF}$. For example, in FIG. 8 is shown again an error amplifier 222a with a respective compensation network 222b.

Often such a PCM control circuit may also use a slope compensation ramp signal SC (e.g., provided via a terminal of the control circuit 22), which is added to the signal $CS_2$ at an adder node 228. Such a slope compensation ramp signal SC may be useful in order to avoid a subharmonic instability that may occur in the PCM architecture when the converter operates in CCM with a duty-cycle greater than 50%.

Accordingly, in the embodiments considered, the inner control loop directly controls the inductor current $I_L$, whereas the outer control loop modulates the maximum/peak inductor current $I_{max}$, and thus indirectly the duty-cycle DC, in order to maintain the output regulation.

Many commercially available controllers exploit the circuit solution shown in FIG. 8, which allows to implement, in an integrated circuit, the error amplifier 222a, the comparator 230, the storage element 230 and optionally the driver circuit 226 for the switch Q1 and optionally Q2. Even though this solution is extremely popular and well know, the main drawbacks are a large area of silicon utilized for an appropriate implementation of the error amplifier 222a, as well as a considerable bias current utilized for the circuits that compose it. Moreover, the solution utilizes the compensation network 222b, which is usually externally connected to the error amplifier 222a, with consequent increase of cost and dimension of the package. Similar drawbacks exist thus also for the solution shown in FIG. 5.

FIG. 9 shows thus an alternative implementation of the control circuit 22, which avoids the error amplifier 222, and which is usually identified as ON-OFF converter.

Substantially, in the example considered, the signal $CS_2$ indicative of the current $I_L$ during the switch-on interval $T_{ON}$ is again compared at a comparator 230 with a reference signal REF, which is however constant or at least predetermined. Conversely, the clock signal CK used to assert the PWM signal DRV is masked via an enable signal at a logic gate 234, such as an AND gate. Specifically, the enable signal is generated by a further comparator 236 configured to assert the enable signal in response to determining that the feedback signal FB is smaller than the reference signal $V_{REF}$, wherein:

the signal DRV is only asserted by the PWM signal generator circuit 220 when the feedback signal FB is smaller than the reference signal $V_{REF}$, i.e., the output quantity is smaller than a requested value, once asserted, the signal DRV is de-asserted when the current $I_L$ reaches the predetermined value REF.

Accordingly, the control circuit 220 may just use simple circuit elements, such as two comparators, a logic gate and a latch. However, this solution has a major drawback. In fact, in this electronic converter, the cycle-by-cycle inductor peak current $I_{max}$ is kept constant, while the average switching frequency is modulated to maintain the output regulation. This implies that the switching frequency may fall in the audible range when the converter operates at a light/small output load. For example, audible noise may be generated by mechanical vibrations of the magnetic components, such as the inductance L. Although the vibration effect can be mitigated with specific varnishing processes during the constructions of the magnetic components, such solution is usually not well accepted by the power supply makers and appropriate counteractions are sought to prevent such issue.

BRIEF SUMMARY

Considering the foregoing, various embodiments provide a control circuit for an electronic converter, such as a buck, boost or flyback converter.

As mentioned before, various embodiments of the present disclosure relate to a control circuit for a switching stage of an electronic converter configured to provide via two output terminals an output voltage and an output current.

In various embodiments, the control circuit includes one or more first terminals configured to provide one or more respective drive signals to one or more electronic switches of the switching stage, and a driver circuit configured to generate the one or more drive signals as a function of a PWM signal, wherein the PWM signal has switching cycles with a switching period, where the PWM signal is asserted for a switch-on interval and de-asserted for a switch-off interval. For example, the driver circuit may generate a single drive signal, wherein the switching period, the switch-on interval and the switch-off interval of the single drive signal correspond to the switching period, the switch-on interval and the switch-off interval of the PWM signal, respectively. Alternatively, the driver circuit may generate a first and a second drive signal as a function of the PWM signal. For example, in CCM, the first drive signal may correspond to the PWM signal, and the second drive signal may essentially correspond to the inverted version of the PWM signal. Conversely, in DCM, the second drive signal may be generated as a function of the PWM signal and a signal indicating a demagnetization of the inductance of the switching stage.

In various embodiments, the control circuit includes a second terminal configured to receive from a feedback circuit a first feedback signal having a voltage being indicative of the output voltage, the output current or an output power provided via the two output terminals, and a third terminal configured to receive from a current sensor a second feedback signal having a voltage being indicative of a current flowing during the switch-on interval through an inductance of the switching stage.

In various embodiments, a PWM signal generator circuit of the control circuit is thus configured to generate the PWM signal as a function of the first feedback signal and the second feedback signal.

Specifically, in various embodiments, the PWM signal generator circuit includes a comparator and a storage element. Specifically, in response to determining that the second feedback signal is greater than a reference signal, the comparator asserts a comparison signal. Conversely, in response to determining that the second feedback signal is smaller than the reference signal, the comparator de-asserts the comparison signal. In response to the clock signal, the storage element asserts the PWM signal, whereby the clock signal indicates the duration of the switching period. Moreover, in response to determining that the comparison signal is asserted, the storage element de-assert the PWM signal.

In various embodiments, the PWM signal generator circuit includes thus also a circuit configured to generate the reference signal. Specifically, in various embodiments, the reference signal is generated as a function of the voltage at a capacitance. For example, the reference signal may correspond to the voltage at the capacitance, or the circuit may include an amplifier configured to generate the reference signal by amplifying the voltage at the capacitance.

In particular, in various embodiments, the circuit includes a further comparator and a charge and discharge circuit. Specifically, in response to determining that the feedback signal is greater than the reference voltage, the further comparator asserts a further comparison signal. Conversely, in response to determining that the feedback signal is smaller than the reference voltage, the further comparator de-asserts the further comparison signal.

In various embodiments, the charge and discharge circuit is configured to charge the capacitance when the further comparison signal is de-asserted, and discharge the capacitance when the further comparison signal is asserted. For example, the charge and discharge circuit may include a charge circuit configured to charge the capacitance and a discharge circuit configured to discharge the capacitance. For example, the charge circuit may be configured to selectively charge the capacitance when the further comparison signal is de-asserted, and/or the discharge circuit may be configured to selectively discharge the capacitance when the further comparison signal is asserted. For example, a first terminal of the capacitance may be connected to a reference voltage and the charge circuit may include a first current source connected between a supply voltage and the second terminal of the capacitance, wherein the first current source is configured to provide a positive charge current, or the charge circuit may include a first resistance connected between the supply voltage and the second terminal of the capacitance. Similarly, the discharge circuit may include a second current source connected between the second terminal of the capacitance and the reference voltage, wherein the second current source is configured to provide a negative discharge current, or the discharge circuit may include a second resistance connected between the second terminal of the capacitance and the reference voltage.

In various embodiments, a method controls a switching stage of an electronic converter configured to provide, via two output terminals of the electronic converter, an output voltage and an output current. The method includes providing, from one or more first terminals of a control circuit, one or more respective drive signals to one or more electronic switches of the switching stage and generating, with a pulse-width modulation (PWM) signal generator circuit of the control circuit, a PWM signal having switching cycles with a switching period based on a clock cycle of a clock signal. The method includes asserting, with a storage element of the PWM signal generator circuit, the PWM signal for a switch-on interval in response to the clock cycle, de-asserting, with the storage element, the PWM signal for a switch-off period in response to determining that a first comparison signal is asserted, and generating, with a driver circuit of the control circuit, the one or more drive signals as a function of the PWM signal. The method includes receiving, with a second terminal of the control circuit, a first feedback signal from a feedback circuit, the first feedback signal having a voltage indicative of the output voltage, the output current or an output power provided via the two output terminals, receiving, with a third terminal of the control circuit from a current sensor, a second feedback signal, the second feedback signal having a voltage indicative of a current flowing during the switch-on interval through an inductance of the switching stage, and generating a reference voltage as a function of a voltage at a capacitance of the PWM signal generator circuit. The method includes generating, with a circuit of the PWM signal generator circuit, a reference signal as a function of the first feedback signal and the reference voltage, asserting, with a first comparator of the PWM signal generator circuit, a first comparison signal in response to determining that the second feedback signal is greater than the reference signal and de-asserting, with the first comparator, the first comparison signal in response to determining that the second feedback signal is smaller than the reference signal. The method includes asserting, with a second comparator of the circuit, a second comparison signal in response to determining that the first feedback signal is greater than the reference voltage and de-asserting, with the second comparator, the second comparison signal in response to determining that the first feedback signal is smaller than the reference voltage. The method includes charging, with a charge and discharge circuit of the PWM signal generator circuit, the capacitance when the first comparison signal is de-asserted, and discharging, with the charge and discharge circuit, the capacitance when the second comparison signal is asserted.

In various embodiments, a device includes a control circuit. The control circuit including a pulse-width modulation (PWM) signal generator circuit. The PWM signal generator includes a first comparator including a first input, a second input, and an output. The PWM signal generator circuit includes a capacitor having a first terminal coupled to the output of the first comparator and a second comparator having a first input coupled to the first terminal of the capacitor, a second input, and an output. The PWM signal generator circuit includes a current source coupled between a supply voltage and the first terminal of the capacitor and a storage element having a first input coupled to the output of the second comparator, a second input coupled to a clock input terminal of the PWM signal generator circuit, and an output configured to provide a PWM signal.

BRIEF DESCRIPTION OF THE SEVERAL VIEWS OF THE DRAWINGS

The embodiments of the present disclosure will now be described with reference to the of drawings, which are provided purely to way of non-limiting example and in which.

The features and advantages of the present disclosure will become apparent from the following detailed description of practical embodiments thereof, shown by way of non-limiting example in the accompanying drawings, in which.

DETAILED DESCRIPTION

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment," "in one embodiment," or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

Figure 8:
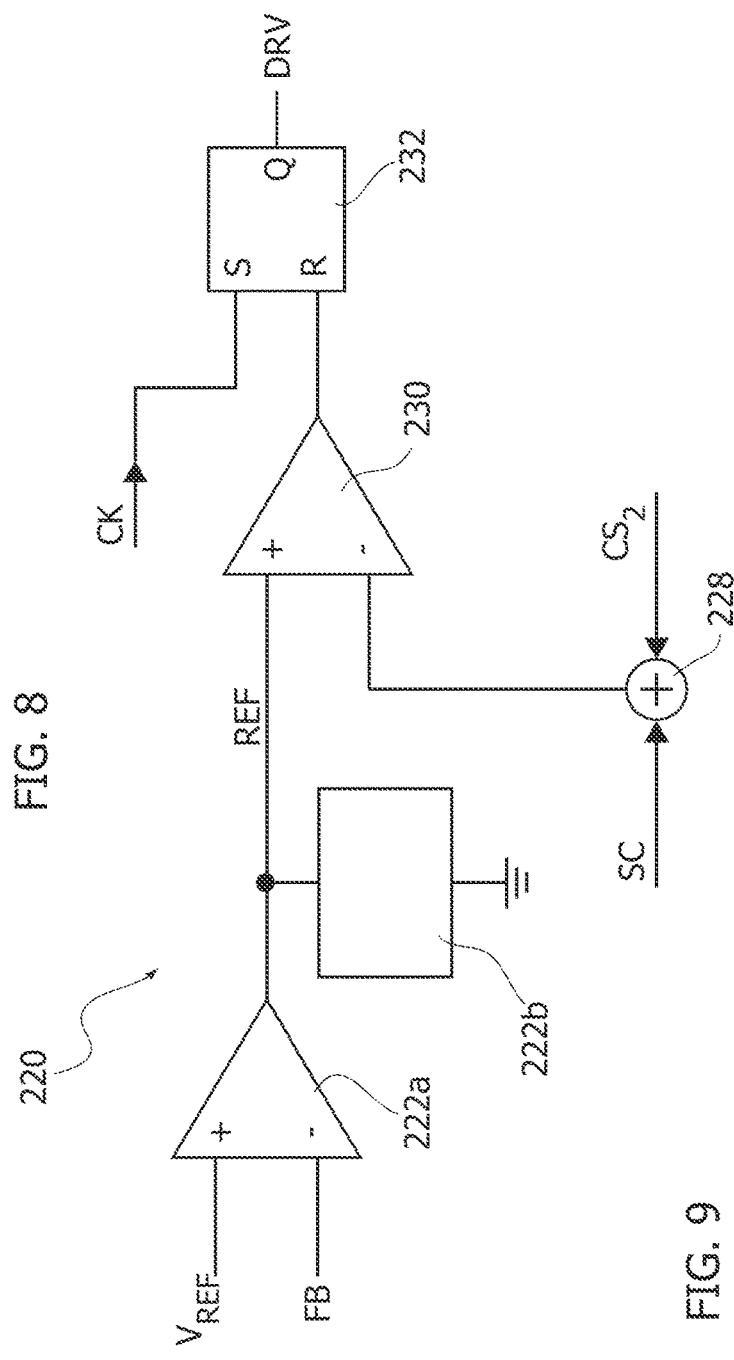
FIGS. 8 and 9 show further examples of PWM signal generator circuits for electronic converters.
Figure 9:
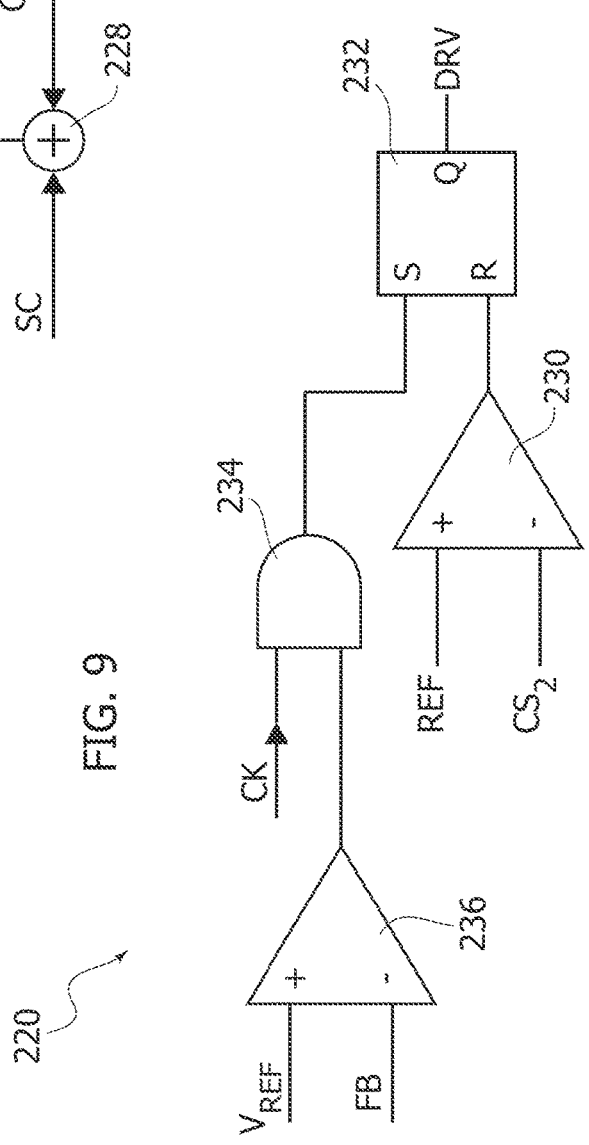
Figure 10:
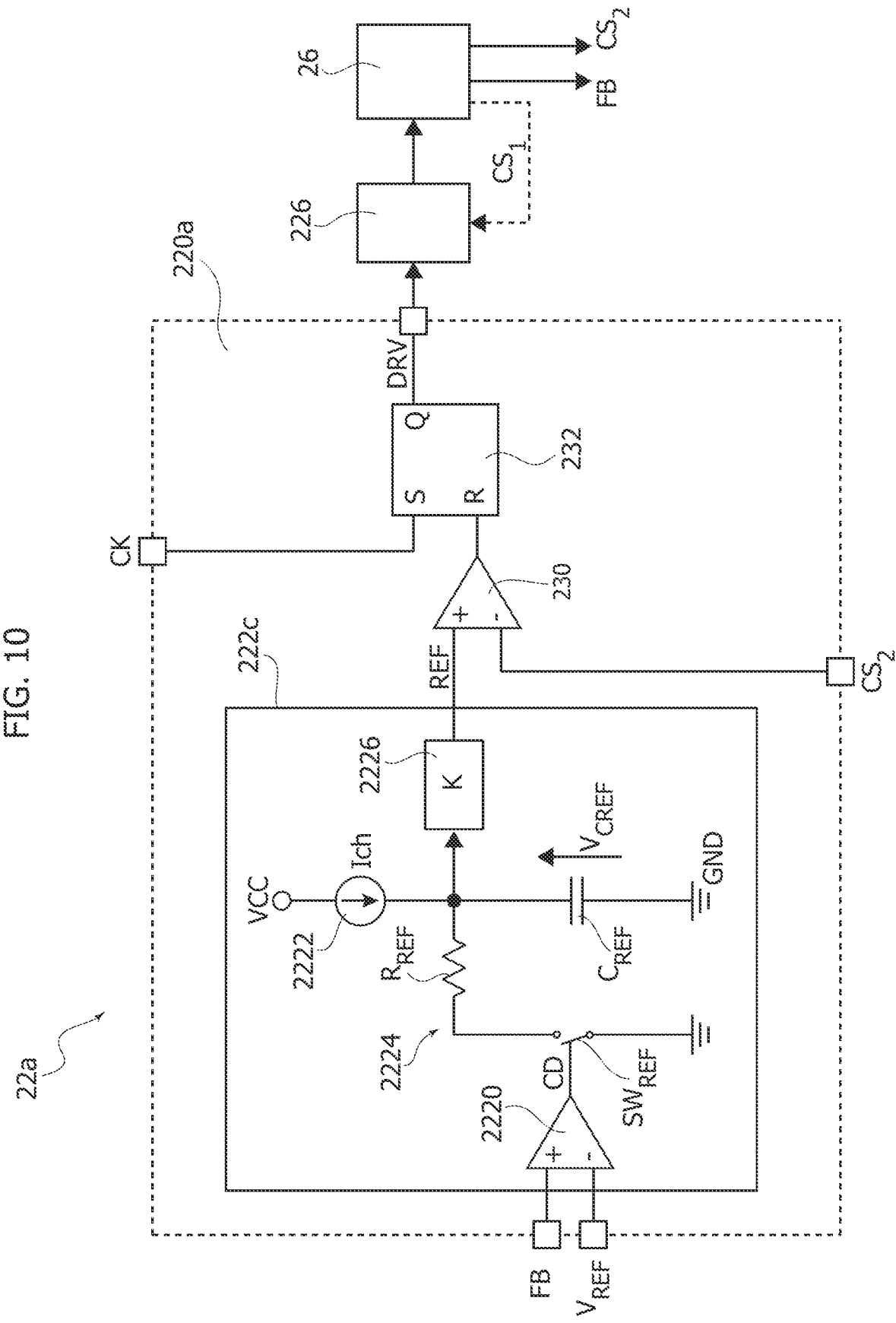
FIG. 10 shows an embodiment of a control circuit including a PWM signal generator circuit according to an embodiment of the present disclosure.
Figure 11:
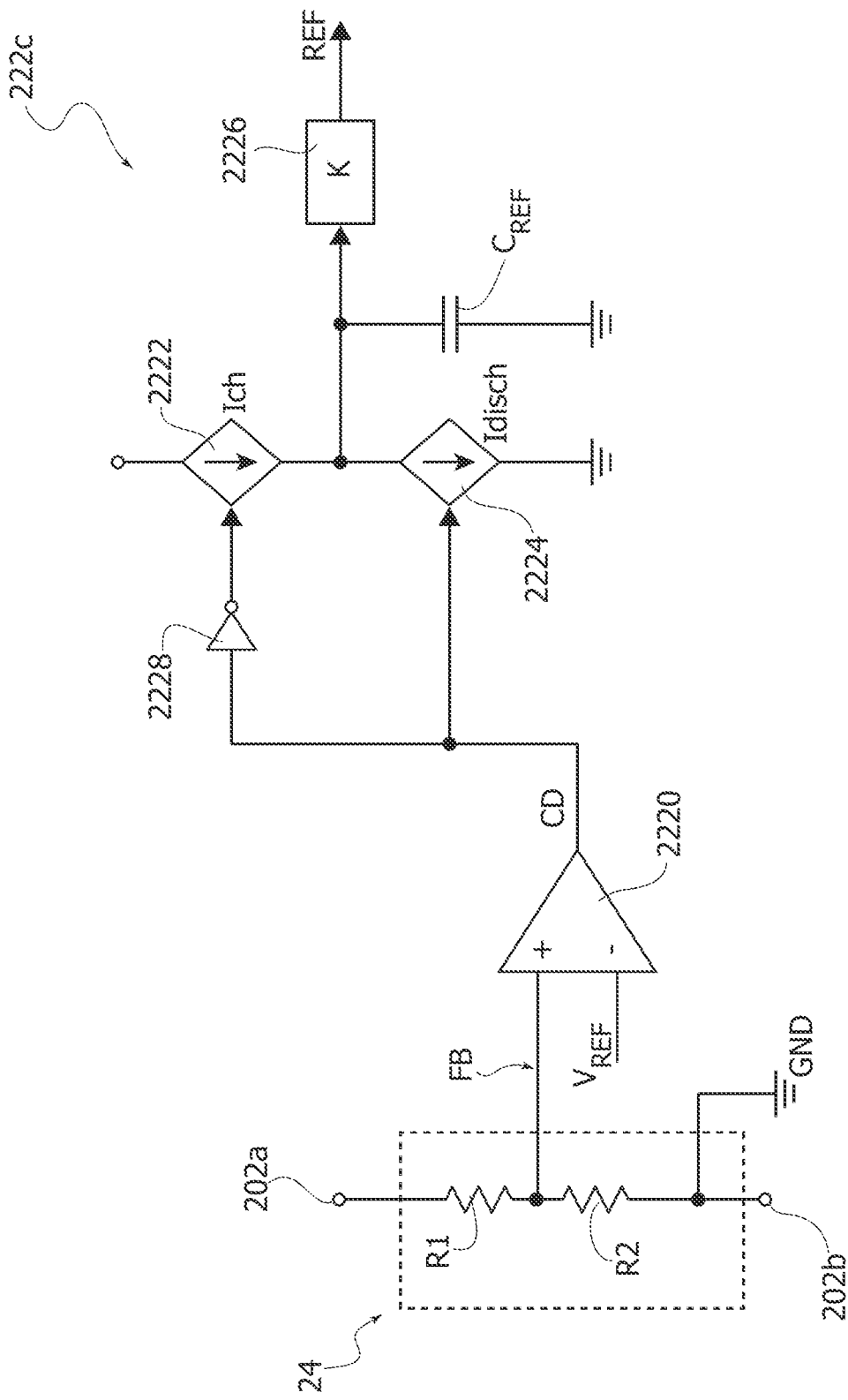
FIG. 11 shows a further embodiment of a PWM signal generator circuit according to an embodiment of the present disclosure.
Figure 12:
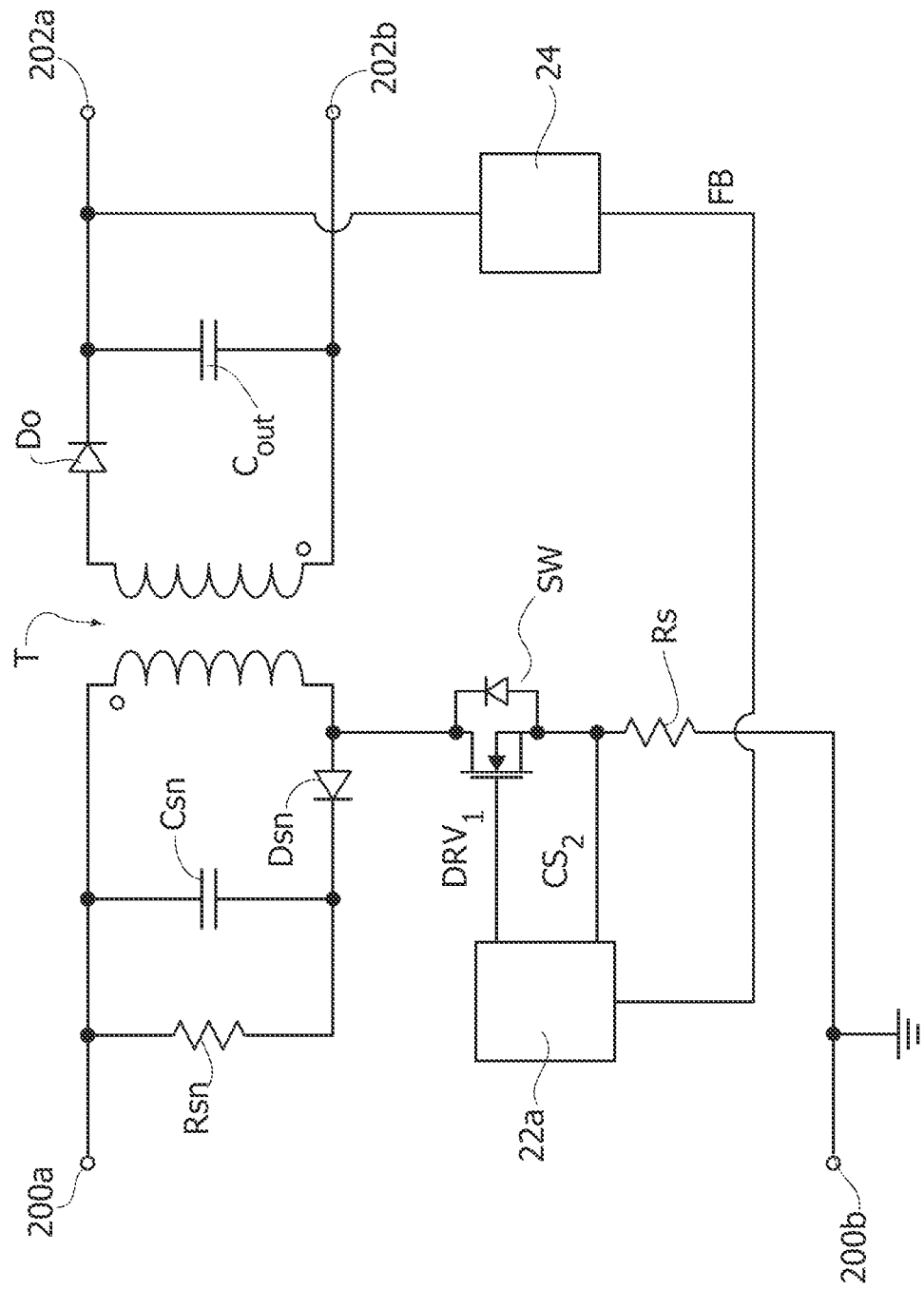
FIG. 12 shows an embodiment of a flyback converter including a control circuit according to an embodiment of the present disclosure.

In FIGS. 10 to 12 described below, parts, elements or components that have already been described with reference to FIGS. 1 to 9 are designated by the same references used previously in these figures. The description of these elements has already been made and will not be repeated in what follows in order not to burden the present detailed description.

As explained in the foregoing, various embodiments of the present disclosure relate to a control circuit for an electronic converter. For a general description of electronic converters and respective control circuits using a PWM signal generator circuit reference can be made to the previous description of FIGS. 1 to 9.

Specifically, various embodiments of the present disclosure relate to control methods providing an alternative to the standard peak current-mode architecture, which overcome the limitations of the solutions discussed with respect to the control circuits shown in FIGS. 8 and 9. Substantially, the solutions disclosed in the following, permit to emulate the PCM operations disclosed with respect to FIG. 8 in an ON-OFF architecture as disclosed with respect to FIG. 9, however without utilizing an error amplifier 222a with respective compensation network 222b.

Figure 1:
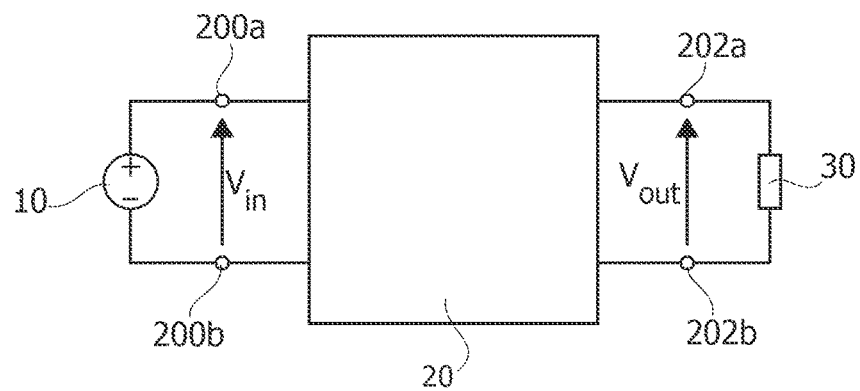
FIG. 1 shows an example of an electronic converter.
Figure 2:
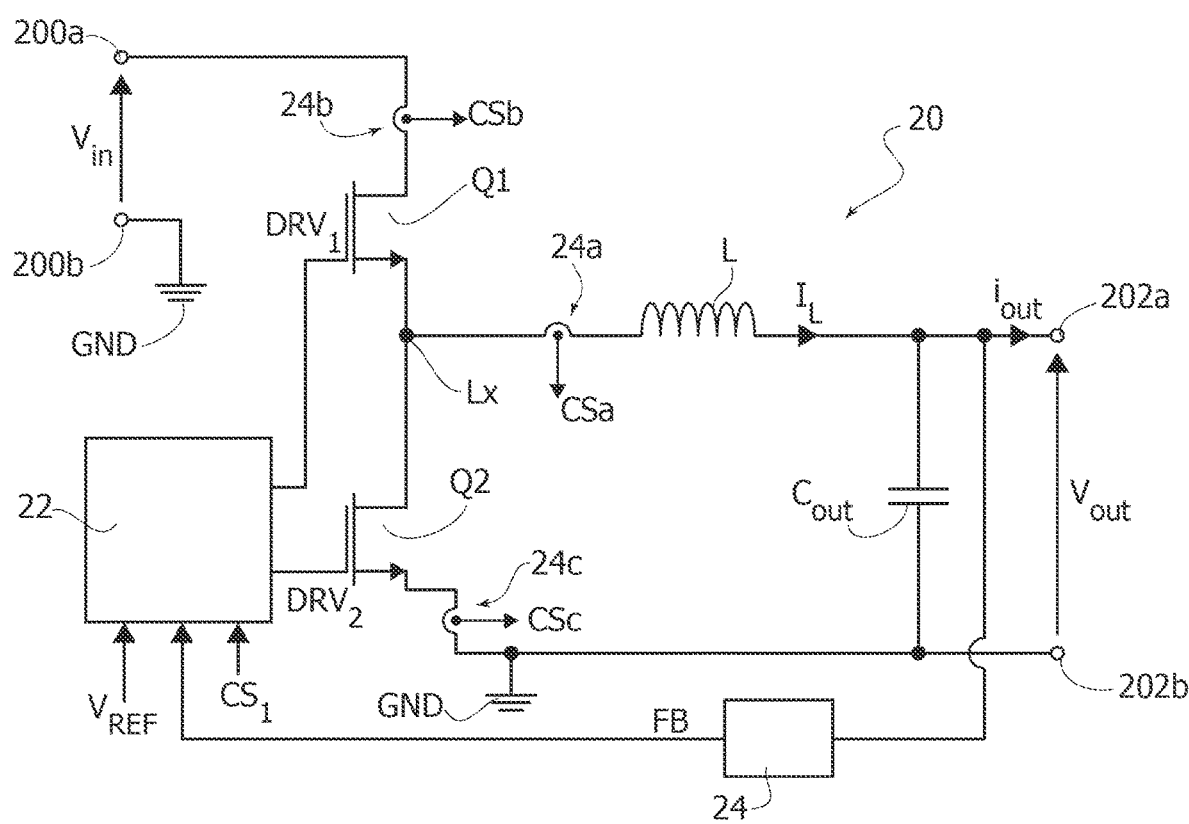
FIG. 2 shows an example of a buck converter.
Figure 3:
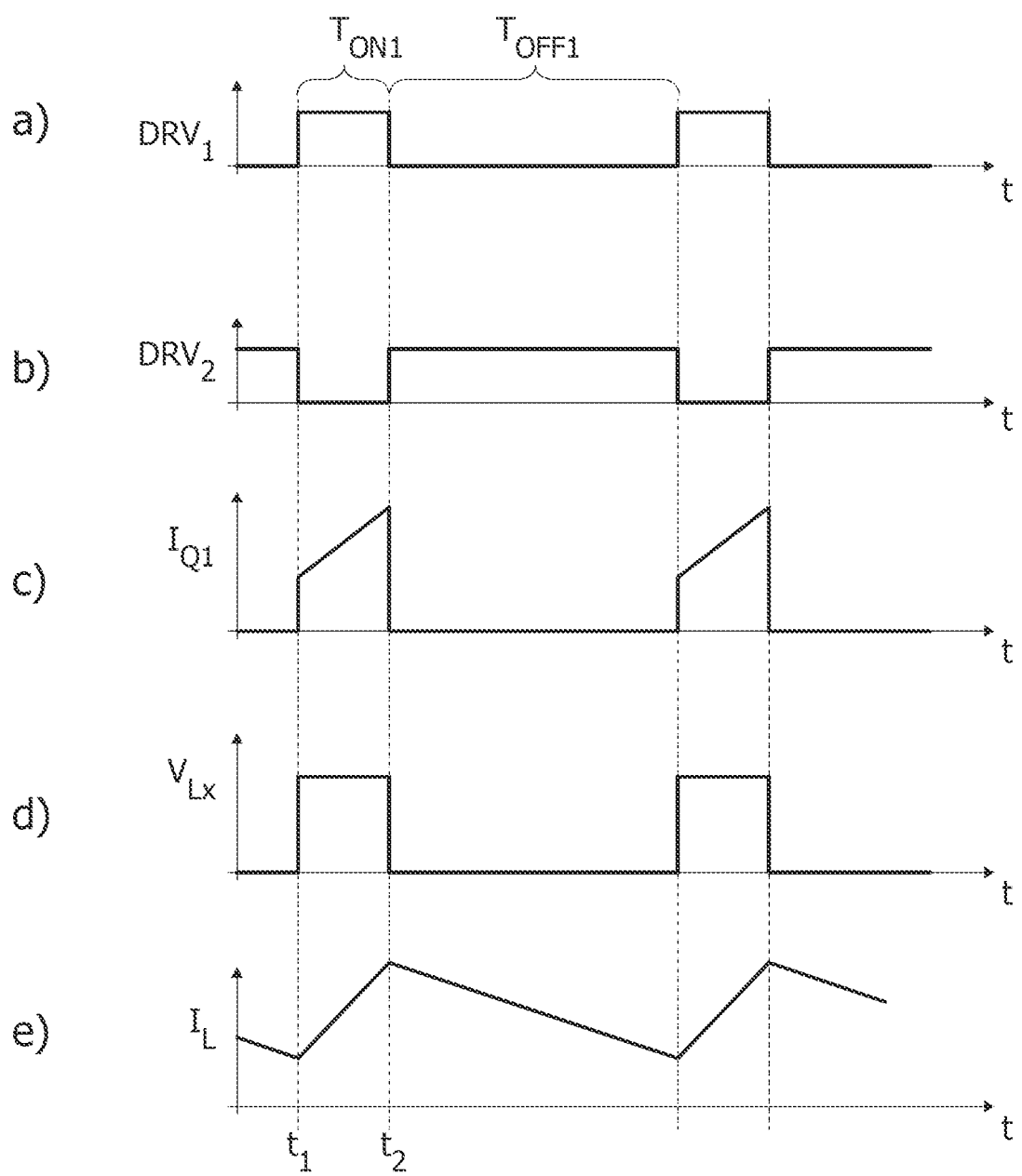
FIG. 3 shows exemplary waveforms of the buck converter of FIG. 2.
Figure 4A:
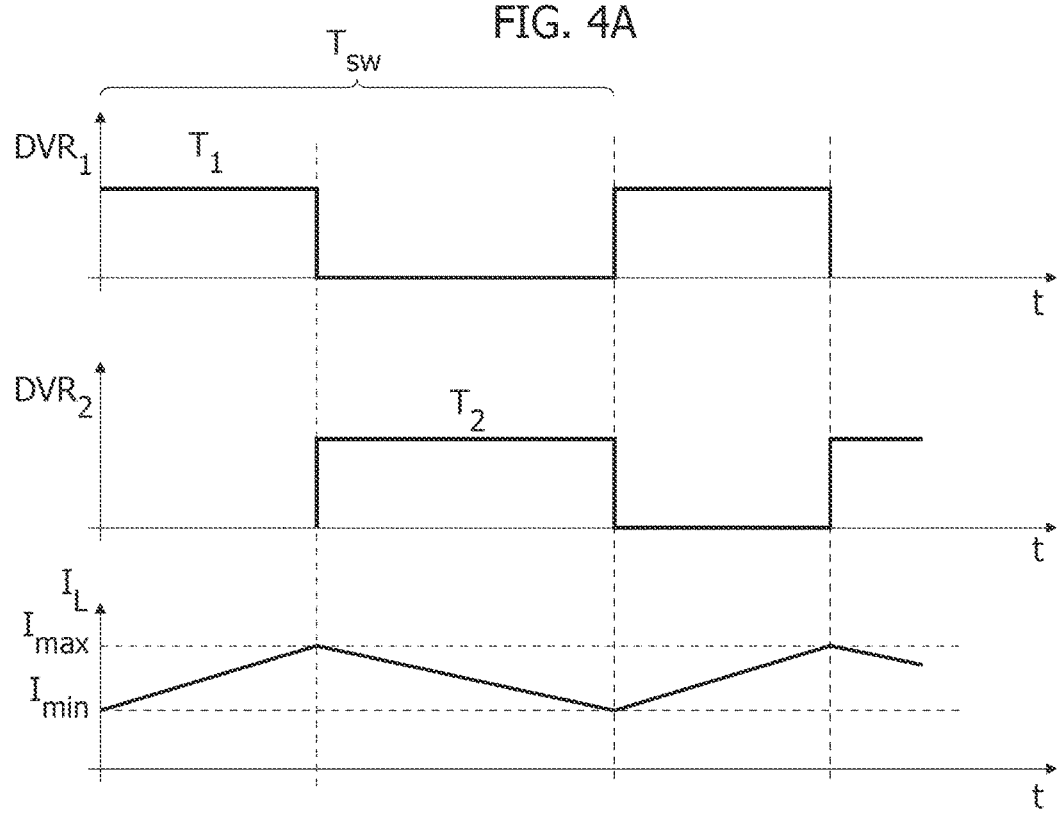
FIG. 4A shows waveforms when the buck converter of FIG. 2 is operated in a CCM mode.
Figure 4B:
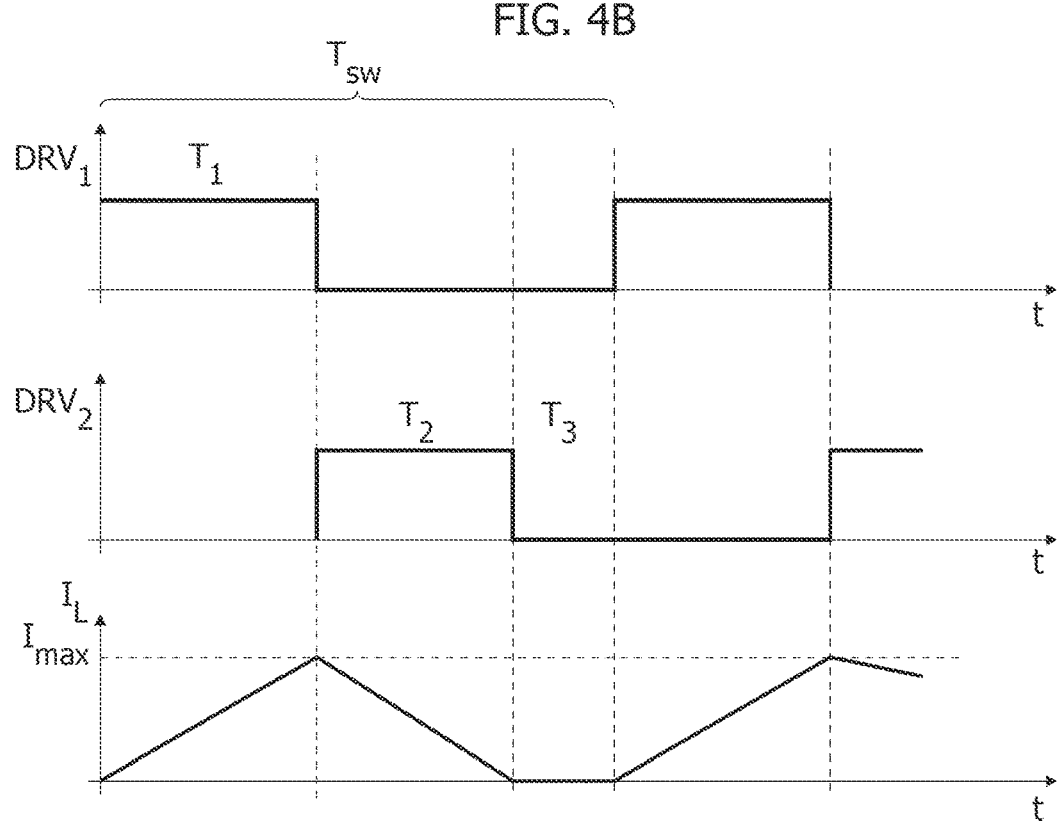
FIG. 4B shows waveforms when the buck converter of FIG. 2 is operated in a DCM mode.
Figure 5:
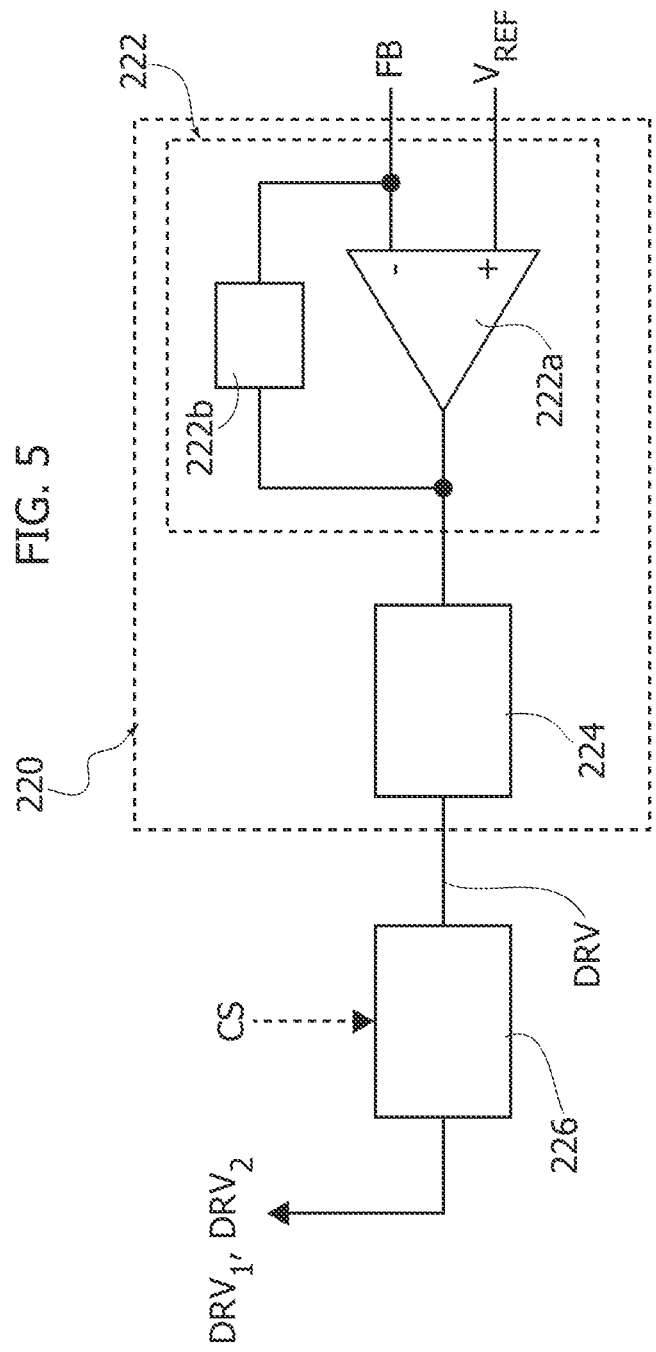
FIG. 5 shows an example of a control circuit for an electronic converter, wherein the control circuit includes a PWM signal generator circuit.
Figure 6:
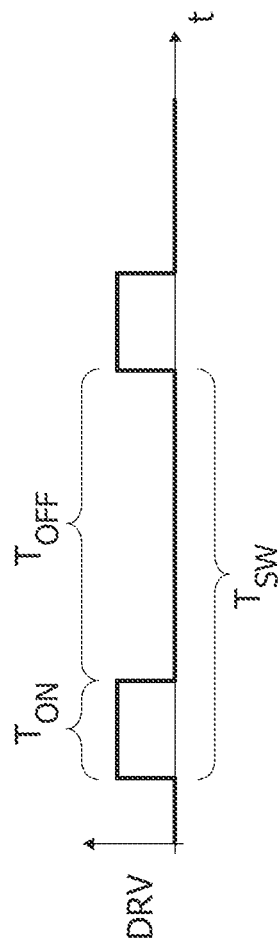
FIG. 6 shows an example of a PWM signal generated by the PWM signal generator circuit of FIG. 6.
Figure 7:
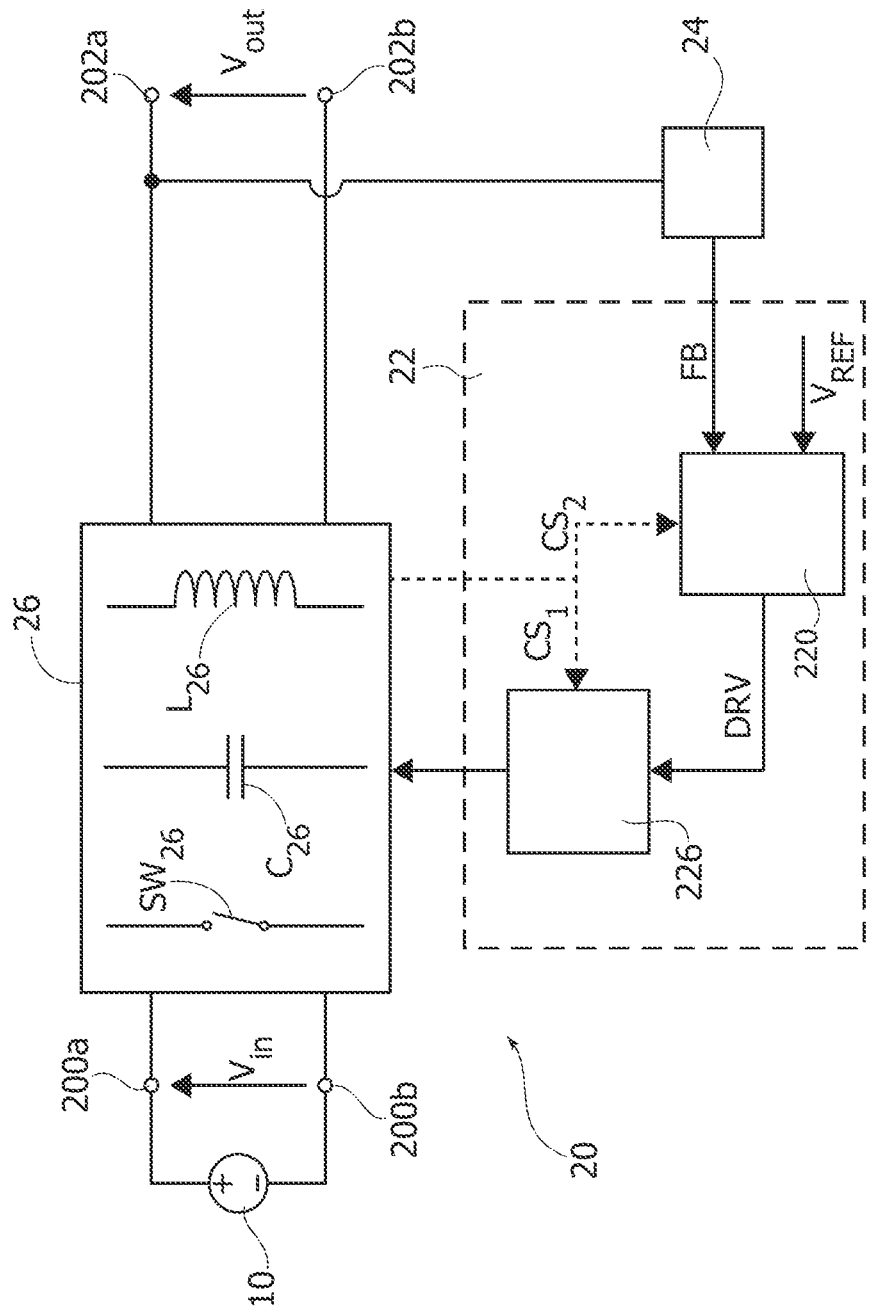
FIG. 7 shows an example of a generic electronic converter including a control circuit with a PWM signal generator circuit.

FIG. 10 shown an embodiment of a control circuit 22a according to the present disclosure, which may be used in an electronic converter as described, e.g., with respect to FIG. 7. As mentioned before, the switching stage 26 of such an electronic converter includes at least one inductance $L_{26}$, such as an inductor or transformer, optionally one or more capacitances $C_{26}$, such as a capacitor, and one or more electronic switches $SW_{26}$ configured to control the current flowing through the inductance $L_{26}$.

Specifically, in line with the previous description, the control circuit 22a, e.g., in the form of an integrated circuit, includes a PWM signal generator circuit 220a configured to generate a PWM signal DRV, and a driver circuit 226 configured to generate the drive signals for the one or more electronic switches $SW_{26}$ of the switching stage 26 as a function of the PWM signal DRV. In general, the driver circuit 226 and possibly also the one or more electronic switches $SW_{26}$ may be integrated in the integrated circuit of the control circuit or may be provided as a separate integrated circuit. As described in the foregoing, the specific implementation of the driver circuit 226 depends on the number of electronic switches $SW_{26}$ (usually one or two electronic switches) and whether CCM or DCM is used. For example, as schematically shown in FIG. 10, in DCM, the driver circuit 226 may also receive a signal $CS_1$ indicative of the instant of demagnetization of the inductance $L_{26}$ of the switching stage 26.

In line with the description of FIG. 8, the PWM signal generator circuit 220a includes:

a first terminal configured to provide the PWM signal DRV, wherein the PWM signal DRV has switching cycles with a switching period $T_{SW}$, where the signal DRV is asserted for a switch-on interval $T_{ON}$ and de-asserted for a switch-off interval $T_{OFF}$, with $T_{SW}=T_{ON}+T_{OFF}$;

a second terminal configured to receive a first feedback signal FB, where the voltage of the feedback signal FB is indicative of (and preferably proportional to) the output quantity to be regulated, such as the output voltage $V_{out}$, the output current $i_{out}$ or the output power;

a third terminal configured to receive a second feedback signal $CS_2$, where the voltage of the feedback signal $CS_2$ is indicative of (and preferably proportional to) the current flowing through the inductance $L_{26}$ of the switching stage 26 (at least) during the switch-on interval $T_{ON}$;

a fourth terminal configured to receive a reference voltage $V_{REF}$ indicative of a requested value for the feedback signal FB; and a fifth terminal configured to receive a clock signal CK indicative of the duration of the switching period $T_{SW}$.

For example, in an electronic converter, the second and the third terminal of the control circuit 22a, such as pins or pads of a respective integrated circuit, may be connected to a respective feedback circuit 24 and a respective current sensor associated with the switching stage 26. Generally, the feedback circuit 24 and/or the current sensor may also be integrated in the integrated circuit of the control circuit 22a.

In various embodiments, the fourth and/or the fifth terminal are connected to a voltage source and a clock generator/oscillator, respectively. In various embodiments, the voltage source and/or the clock generator/oscillator may also be integrated in the integrated circuit of the control circuit 22a. For example, in various embodiments, the control circuit 22a includes a voltage source providing a fixed/constant reference voltage $V_{REF}$. In this case, the relationship between the reference voltage $V_{REF}$ and the output quantity to be regulated may be adjusted by adapting the proportionality between the feedback signal FB and the output quantity. For example, when monitoring the output voltage $V_{out}$, the proportionality of the feedback signal FB may be set by selecting the resistance values of a voltage divider used to monitor the output voltage $V_{out}$, wherein the resistances of the voltage divider are connected between the output terminal 202a and 202b.

Moreover, in line with the description of FIG. 8, the PWM signal generator circuit 220a includes:

a comparator 230 configured to assert a comparison signal when the value/amplitude of the feedback signal $CS_2$ reaches or exceeds a reference signal REF;

a storage element 232, such as a set-reset latch or flip-flop, configured to assert the PWM signal DRV in response to (the rising and/or falling edged of) the clock signal CK, and de-assert the PWM signal DRV in response to determining that the comparison signal provided by the comparator 230 is asserted; and a circuit 222c configured to generate the reference signal REF as a function of the feedback signal FB and the reference signal $V_{REF}$.

Accordingly, various embodiments of the present disclosure relate to the implementation of the circuit 222c configured to generate the reference signal REF. Substantially, in various embodiments, the circuit 222c is configured to emulate the behavior of the PCM regulator 222 described with respect to FIG. 8.

Specifically, in the embodiment considered, the feedback signal FB and the reference voltage $V_{REF}$ are provided to a comparator 2220 configured to assert a respective comparison signal CD when the feedback signal FB is greater than the reference voltage $V_{REF}$ and de-assert the comparison signal CD when the feedback signal FB is smaller than the reference voltage $V_{REF}$.

Specifically, in the embodiment considered, the circuit 222c is configured to charge a capacitance $C_{REF}$ when the comparison signal CD is de-asserted and discharge the capacitance $C_{REF}$ when the comparison signal CD is asserted, i.e., the signal CD indicates whether to charge or discharge the capacitance $C_{REF}$.

In various embodiments, the circuit 222c includes for this purpose a charge circuit 2222 configured to charge the capacitance $C_{REF}$ and a discharge circuit 2224 configured to discharge the capacitance $C_{REF}$, wherein at least one of the charge circuit 2222 and the discharge circuit 2224 is selectively enabled as a function of the logic level of the comparison signal CD, i.e., the charge circuit 2222 is configured to selectively charge the capacitance $C_{REF}$ when the signal CD is de-asserted and/or the discharge circuit 2224 is configured to selectively discharge the capacitance $C_{REF}$ when the signal CD is asserted.

For example, in various embodiments, a first terminal of the capacitance $C_{REF}$ is connected to a reference voltage, e.g., representing a ground GND, such as the terminal 202b. In this case, the charge circuit 2222 may be configured to apply a positive current to the second terminal of the capacitance $C_{REF}$. For example, for this purpose, the charge circuit 2222 may be implemented with a current source or a resistor connected between a supply voltage VCC (being greater than the reference voltage) and the second terminal of the capacitance $C_{REF}$, i.e., the charge circuit 2222 and the capacitance $C_{REF}$ may be connected in series between the supply voltage VCC and the reference voltage, e.g., ground GND. Accordingly, in order to selectively enable the charge circuit 2222, the charge circuit 2222 may be configured to selectively enable the current source or may include an electronic switch configured to selectively connect the resistor between the supply voltage VCC and the second terminal of the capacitance $C_{REF}$.

Conversely, in various embodiments, the discharge circuit 2224 is configured to apply a negative current to the second terminal of the capacitance $C_{REF}$. For example, for this purpose, the discharge circuit 2224 may be implemented with a current source or a resistor connected between the second terminal of the capacitance $C_{REF}$ and the reference voltage, e.g., ground GND, i.e., the discharge circuit 2224 and the capacitance $C_{REF}$ may be connected in parallel. Accordingly, in order to selectively enable the discharge circuit 2224, the discharge circuit 2224 may be configured to selectively enable the current source or may include an electronic switch configured to selectively connect the resistor between the second terminal of the capacitance $C_{REF}$ and the reference voltage, e.g., ground GND.

For example, in the embodiment considered, the charge circuit 2222 is always enabled and is implemented with a current source providing a positive (constant or predetermined) charge current Ich. Conversely, the discharge circuit 2224 is implemented with a resistor $R_{REF}$ and an electronic switch $SW_{REF}$ configured to selectively connect the resistor $R_{REF}$ in parallel with the capacitance $C_{REF}$ in response to the signal CD, in particular connect the resistor $R_{REF}$ in parallel with the capacitance $C_{REF}$ when the signal CD is asserted.

Conversely, FIG. 11 shows an embodiment, wherein the charge circuit 2222 is implemented with a current source configured to provide a positive (constant or predetermined) charge current Ich, wherein the current source 2222 is selectively enabled when the signal CD is de-asserted, as schematically shown via an inverter 2228. Conversely, the discharge circuit 2224 is implemented with a current source configured to provide a negative (constant or predetermined) discharge current Idisch, wherein the current source 2224 is selectively enabled when the signal CD is asserted.

Accordingly, in various embodiments, the circuit 222c is configured to: charge the capacitance $C_{REF}$ when the signal CD is de-asserted, thereby increasing the voltage $V_{CREF}$ at the capacitance $C_{REF}$; and discharge the capacitance $C_{REF}$ when the signal CD is asserted, thereby increasing the voltage $V_{CREF}$ at the capacitance $C_{REF}$.

FIG. 11 also shows that the feedback circuit 24 may be implemented in the integrated circuit of the control circuit. For example, for this purpose, the integrated circuit may include two pins or pads configured to be connected to the output terminals 202a and 202b of the electronic converter and a voltage divider including two resistors R1 and R2 connected in series between these pins or pads, wherein the feedback signal FB corresponds to the voltage at the resistor R2.

Accordingly, neglecting the variations of the voltage $V_{CREF}$ during a single switching cycle $T_{SW}$, the circuit 222c is configured to increase or decrease (the average value of) the voltage $V_{CREF}$, until a static condition is reached during the switching cycles $T_{SW}$, i.e., the charge applied to the capacitance $C_{REF}$ when the signal CD is de-asserted corresponds to the charge removed from the capacitance $C_{REF}$ when the signal CD is asserted, whereby the voltage $V_{CREF}$ has the same value at the beginning and at the end of the switch cycles $T_{SW}$.

Accordingly, the voltage $V_{CREF}$ at the capacitance $C_{REF}$ may correspond to the reference signal REF, i.e., REF=$V_{CREF}$, or an additional amplifier circuit 2226 may be used to generate a reference signal REF having a voltage being proportional to the voltage $V_{CREF}$ at the capacitance $C_{REF}$, i.e., REF=K $V_{CREF}$.

As mentioned before, the control circuit 22a disclosed in the foregoing may be used in various types of switched-mode power supplies (SMPS) using PWM signals, such as (single-switch or two-switch) buck, boost, buck-boost and flyback converters For example, FIG. 12 shows an embodiment of a flyback converter.

Specifically, as usually, the flyback converter includes a transformer T, wherein the primary winding of the transformer T and an electronic switch SW, such as a FET, are connected in series between the input terminals 202a and 202b. In various embodiments, the flyback converter may also include a snubber circuit connected in parallel with the primary winding, such as a snubber circuit including a resistor Rsn, a capacitor Csn and a diode Dsn. Conversely, the secondary winding of the transformed T and a diode Do are connected between the output terminals 202a and 202b. Moreover, a capacitor $C_{out}$ is connected between the output terminals 202a and 202b.

Accordingly, in the embodiment considered, the control circuit 22a should provide a drive signal $DRV_1$ for the electronic switch SW (representing the electronic switch $SW_{26}$ of FIG. 7), which may correspond to the PWM signal DRV, or may be generated, e.g., via a FET driver circuit 226 as a function of the PWM signal DRV. Specifically, due to the fact that the flyback converter uses a diode Do, the driver circuit 226 may generate only a single drive signal and the (demagnetization) feedback signal $CS_1$ may be omitted.

Moreover, in the embodiment considered, the control circuit 22a receives a signal $CS_2$ indicative of the current flowing through the primary winding of the transformer T (representing the inductance $L_{26}$ of FIG. 7) during the switch-on interval $T_{ON}$, i.e., when the signal DRV is asserted. For example, for this purpose a shunt resistor Rs may be connected in series with the electronic switch SW, and the signal $CS_2$ may correspond to the voltage at the shunt resistor Rs.

Finally, a feedback circuit 24 is configured to generate the feedback signal FB indicative of the output quantity to be regulated. For example, the feedback circuit 24 may be implemented with a voltage divider configured to provide a signal FB being proportional to the output voltage $V_{out}$.

As mentioned before, the clock signal CK and the reference voltage $V_{REF}$ may be generated within the control circuit 22a or may be received via pins or pads of the control circuit 22a.

The solutions described in the foregoing have the advantage that the charge and discharge circuits 2222 and 2224 may use small currents, e.g., by using current sources providing small currents Ich and Idisch, or by using larger resistances. This implies that also the capacitance $C_{REF}$ may be small. Accordingly, compared to a standard PCM method, the components of the circuit 222c may be implemented easily within the integrated circuit of the control circuit 22a.

For example, if the capacitance $C_{REF}$ is connected externally to the integrated control IC, the capacitance $C_{REF}$ may be between 1 and 50 nF. In this case the charging/discharging currents may be between 100 and 500 uA, and the resistance $R_{REF}$ may be between 1 and 50 kohm. Conversely, in case the capacitance $C_{REF}$ is integrated in the control IC, the capacitance $C_{REF}$ may be between 1 and 50 pF. In this case the charging/discharging currents may be between 1 and 50 uA, and the resistance $R_{REF}$ may be between 100 and 500 kohm.

Of course, without prejudice to the principle of the disclosure, the details of construction and the embodiments may vary widely with respect to what has been described and illustrated herein purely by way of example, without thereby departing from the scope of the present disclosure.

A control circuit (22a) for a switching stage (26) of an electronic converter (20) configured to provide via two output terminals (202a, 202b) an output voltage ($V_{out}$) and an output current ($i_{out}$), the control circuit (22a) may be summarized as including one or more first terminals configured to provide one or more respective drive signals ($DRV_1$, $DRV_2$) to one or more electronic switches ($SW_{26}$; Q1, Q2; SW) of said switching stage (26); a driver circuit (226) configured to generate said one or more drive signals ($DRV_1$, $DRV_2$) as a function of a Pulse-Width Modulation, PWM, signal (DRV), wherein said PWM signal (DRV) has switching cycles with a switching period ($T_{SW}$), where said PWM signal (DRV) is asserted for a switch-on interval ($T_{ON}$) and de-asserted for a switch-off interval ($T_{OFF}$); and a second terminal configured to receive from a feedback circuit (24) a first feedback signal (FB) having a voltage being indicative of said output voltage ($V_{out}$), said output current ($i_{out}$) or an output power provided via said two output terminals (202a, 202b); a third terminal configured to receive from a current sensor (24a, 24b; Rs) a second feedback signal ($CS_2$) having a voltage being indicative of a current ($I_L$) flowing during said switch-on interval ($T_{ON}$) through an inductance ($L_{26}$; L; T) of said switching stage (26); a PWM signal generator circuit (220a) configured to generate said PWM signal (DRV), wherein said PWM signal generator circuit (220a) includes: a comparator (230) configured to: a) in response to determining that said second feedback signal ($CS_2$) is greater than a reference signal (REF), assert a comparison signal, and b) in response to determining that said second feedback signal ($CS_2$) is smaller than said reference signal (REF), de-assert said comparison signal; a storage element (232) configured to: a) in response to said clock signal (CK), assert said PWM signal (DRV), whereby said clock signal (CK) indicates the duration of said switching period ($T_{SW}$); b) in response to determining that said comparison signal is asserted, de-assert said PWM signal (DRV); and a circuit (222c) configured to generate said reference signal (REF) as a function of said first feedback signal (FB) and a reference voltage ($V_{REF}$); wherein said circuit (222c) includes: a further comparator (2220) configured to: a) in response to determining that said feedback signal (FB) is greater than said reference voltage ($V_{REF}$), assert a further comparison signal (CD); b) in response to determining that said feedback signal (FB) is smaller than said reference voltage ($V_{REF}$), de-assert said further comparison signal (CD); a capacitance ($C_{REF}$), wherein said reference signal (REF) is generated as a function of the voltage ($V_{CREF}$) at said capacitance ($C_{REF}$); and a charge and discharge circuit (2222, 2224) configured to: a) charge said capacitance ($C_{REF}$) when said further comparison signal (CD) is de-asserted, and b) discharge said capacitance ($C_{REF}$) when said further comparison signal (CD) is asserted.

Said charge and discharge circuit (2222, 2224) may include a charge circuit (2222) configured to charge said capacitance ($C_{REF}$) and a discharge circuit (2224) configured to discharge said capacitance ($C_{REF}$).

Said charge circuit (2222) may be configured to selectively charge said capacitance ($C_{REF}$) when said further comparison signal (CD) is de-asserted; and/or said discharge circuit (2224) may be configured to selectively discharge said capacitance ($C_{REF}$) when said further comparison signal (CD) is asserted.

Said capacitance ($C_{REF}$) may include a first and a second terminal, wherein the first terminal of said capacitance ($C_{REF}$) is connected to a reference voltage (GND) and said charge circuit (2222) may include a first current source connected between a supply voltage (VCC) and the second terminal of said capacitance ($C_{REF}$), wherein said first current source is configured to provide a positive charge current (Ich); or a first resistance connected between said supply voltage (VCC) and the second terminal of said capacitance ($C_{REF}$).

Said capacitance ($C_{REF}$) may include a first and a second terminal, wherein the first terminal of said capacitance ($C_{REF}$) is connected to a reference voltage (GND) and said discharge circuit (2224) may include a second current source connected between the second terminal of said capacitance ($C_{REF}$) and said reference voltage (GND), wherein said second current source is configured to provide a negative discharge current (Idisch); or a second resistance ($R_{REF}$) connected between the second terminal of said capacitance ($C_{REF}$) and said reference voltage (GND).

Said reference signal (REF) may correspond to the voltage ($V_{CREF}$) at said capacitance ($C_{REF}$), or said circuit (222c) may include an amplifier (2226) configured to generate said reference signal (REF) by amplifying the voltage ($V_{CREF}$) at said capacitance ($C_{REF}$).

The control circuit (22a) may include at least one of: said one or more electronic switches ($SW_{26}$; Q1, Q2; SW) of said switching stage (26); said feedback circuit (24); and said current sensor (24a, 24b; Rs).

An integrated circuit may be summarized as including a control circuit.

An electronic converter may be summarized as including a switching stage (26), such as a buck, boost, buck-boost or flyback converter, and a control circuit.

A method of controlling a switching stage (26) of an electronic converter, may be summarized as including driving said switching stage (26) via a control circuit.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising a control circuit for a switching stage of an electronic converter configured to provide via two output terminals an output voltage and an output current, the control circuit including:
   one or more first terminals configured to provide one or more respective drive signals to one or more electronic switches of the switching stage;
   a driver circuit configured to generate the one or more drive signals as a function of a pulse-width modulation (PWM) signal, wherein the PWM signal has switching cycles with a switching period, wherein the PWM signal is asserted for a switch-on interval and de-asserted for a switch-off interval; and
   a second terminal configured to receive from a feedback circuit a first feedback signal having a voltage being indicative of the output voltage, the output current or an output power provided via the two output terminals;
   a third terminal configured to receive from a current sensor a second feedback signal having a voltage being indicative of a current flowing during the switch-on interval through an inductance of the switching stage;
   a PWM signal generator circuit configured to generate the PWM signal, wherein the PWM signal generator circuit includes:
     a first comparator configured to:
       assert a first comparison signal in response to determining that the second feedback signal is greater than a reference signal; and
       de-assert the first comparison signal in response to determining that the second feedback signal is smaller than the reference signal;
     a storage element configured to:
       assert the PWM signal in response to a clock signal, whereby the clock signal indicates the duration of the switching period; and
       de-assert the PWM signal in response to determining that the first comparison signal is asserted; and
     a circuit configured to generate the reference signal as a function of the first feedback signal and a reference voltage;
     wherein the circuit includes:
       a second comparator configured to:
         assert a second comparison signal in response to determining that the feedback signal is greater than the reference voltage; and
         de-assert the second comparison signal in response to determining that the feedback signal is smaller than the reference voltage;
       a capacitance, wherein the reference signal is generated as a function of the voltage at the capacitance; and
       a charge and discharge circuit configured to:
         charge the capacitance when the second comparison signal is de-asserted, and
         discharge the capacitance when the second comparison signal is asserted.

2. The device according to claim 1, wherein the charge and discharge circuit includes a charge circuit configured to charge the capacitance and a discharge circuit configured to discharge the capacitance.

3. The device according to claim 2, wherein:
   the charge circuit is configured to selectively charge the capacitance when the second comparison signal is de-asserted; or the discharge circuit is configured to selectively discharge the capacitance when the second comparison signal is asserted.

4. The device according to claim 2, wherein the capacitance includes a first terminal and a second terminal, wherein the first terminal of the capacitance is connected to a reference voltage across a resistor and the charge circuit includes:
a first current source connected between a supply voltage and the second terminal of the capacitance, wherein the first current source is configured to provide a positive charge current; or
a first resistance connected between the supply voltage and the second terminal of the capacitance.

5. The device according to claim 2, wherein the capacitance includes a first and a second terminal, wherein the first terminal of the capacitance is connected to a reference voltage across a resistor and the discharge circuit includes:
a second current source connected between the second terminal of the capacitance and the reference voltage, wherein the second current source is configured to provide a negative discharge current; or
a second resistance connected between the second terminal of the capacitance and the reference voltage.

6. The device according to claim 1, wherein the reference signal corresponds to the voltage at the capacitance, or the circuit includes an amplifier configured to generate the reference signal by amplifying the voltage at the capacitance.

7. The device according to claim 1, wherein the control circuit includes at least one of:
the one or more electronic switches of the switching stage;
the feedback circuit; and
the current sensor.

8. The device of claim 1, comprising an integrated circuit including the control circuit.

9. The device of claim 1, comprising the electronic converter, the electronic converter including:
the switching stage, wherein the switch stage is a buck, boost, buck-boost or flyback converter, and
the control circuit.

10. A method for controlling a switching stage of an electronic converter configured to provide, via two output terminals of the electronic converter, an output voltage and an output current, the method comprising:
providing, from one or more first terminals of a control circuit, one or more respective drive signals to one or more electronic switches of the switching stage;
generating, with a pulse-width modulation (PWM) signal generator circuit of the control circuit, a PWM signal having switching cycles with a switching period based on a clock cycle of a clock signal;
asserting, with a storage element of the PWM signal generator circuit, the PWM signal for a switch-on interval in response to the clock cycle;
de-asserting, with the storage element, the PWM signal for a switch-off period in response to determining that a first comparison signal is asserted;
generating, with a driver circuit of the control circuit, the one or more drive signals as a function of the PWM signal;
receiving, with a second terminal of the control circuit, a first feedback signal from a feedback circuit, the first feedback signal having a voltage indicative of the output voltage, the output current or an output power provided via the two output terminals;
receiving, with a third terminal of the control circuit from a current sensor, a second feedback signal, the second feedback signal having a voltage indicative of a current flowing during the switch-on interval through an inductance of the switching stage;
generating a reference voltage as a function of a voltage at a capacitance of the PWM signal generator circuit;
generating, with a circuit of the PWM signal generator circuit, a reference signal as a function of the first feedback signal and the reference voltage;
asserting, with a first comparator of the PWM signal generator circuit, the first comparison signal in response to determining that the second feedback signal is greater than the reference signal;
de-asserting, with the first comparator, the first comparison signal in response to determining that the second feedback signal is smaller than the reference signal;
asserting, with a second comparator of the circuit, a second comparison signal in response to determining that the first feedback signal is greater than the reference voltage;
de-asserting, with the second comparator, the second comparison signal in response to determining that the first feedback signal is smaller than the reference voltage;
charging, with a charge and discharge circuit of the PWM signal generator circuit, the capacitance when the first comparison signal is de-asserted; and
discharging, with the charge and discharge circuit, the capacitance when the second comparison signal is asserted.

11. The method of claim 10, comprising:
driving the switching stage via the control circuit.

12. The method of claim 10, comprising:
charging the capacitance with a charge circuit of the charge and discharge circuit; and
discharging the capacitance with a discharge circuit of the charge and discharge circuit.

13. The method of claim 12, comprising selectively charging, with the charge circuit, the capacitance when the second comparison signal is de-asserted.

14. The method of claim 12, comprising selectively discharging, with the discharge circuit, the capacitance when the second comparison signal is asserted.

15. The method of claim 12, comprising providing a positive charge current with a first current source of the charge circuit, wherein a first terminal of the capacitance is coupled to the reference voltage, wherein the first current source is coupled between a supply voltage and a second terminal of the capacitance.

16. The method of claim 15, wherein the capacitance includes a first and a second terminal, wherein the first terminal of the capacitance is connected to the reference voltage, the method comprising providing, with a second current source of the discharge circuit coupled between the reference voltage and the second terminal of the capacitance, a negative discharge current.

17. A device, comprising:
a control circuit, the control circuit including a pulse-width modulation (PWM) signal generator circuit having:
a first comparator including a first input, a second input, and an output;
a capacitor having a first terminal coupled to the output of the first comparator;

a second comparator having a first input coupled to the first terminal of the capacitor, a second input, and an output;

a current source coupled between a supply voltage and the first terminal of the capacitor; and a storage element having a first input coupled to the output of the second comparator, a second input coupled to a clock input terminal of the PWM signal generator circuit, and an output configured to provide a PWM signal;

a resistor coupled between the output of the first comparator and the first terminal of the capacitor; and an amplifier coupled between the first terminal of the capacitor and the first input of the second comparator, wherein the capacitor includes a second terminal coupled to ground;

a driver coupled to the PWM signal generator circuit and configured to receive the PWM signal; and a switching stage coupled to the driver, wherein the driver is configured to drive the switching stage based on the PWM signal, wherein the switching stage is configured to generate an output voltage.

18. The device of claim 17, wherein: the first input of the first comparator receives a first feedback signal from the switching stage; the second input of the first comparator receives a reference voltage; and the second terminal of the second comparator receives a second feedback signal from the switching stage.

* * * * *